United States Patent [19]

Nitschke

[11] 4,397,672

[45] Aug. 9, 1983

[54] GLASS SHEET TEMPERING UTILIZING HIGH DENSITY AIR QUENCHING

[76] Inventor: John S. Nitschke, 324 E. Second, Perrysburg, Ohio 43551

[21] Appl. No.: 346,421

[22] Filed: Feb. 5, 1982

[51] Int. Cl.³ .......................................... C03B 27/04
[52] U.S. Cl. ...................................... 65/114; 65/348; 65/351
[58] Field of Search .................. 65/114, 115, 348, 351

[56] References Cited

U.S. PATENT DOCUMENTS

| | | | |
|---|---|---|---|
| 1,971,268 | 8/1934 | Long | 65/114 |
| 2,525,112 | 10/1950 | Baker | 65/114 |
| 3,806,312 | 4/1974 | McMaster et al. | 65/118 X |
| 3,907,132 | 9/1975 | McMaster et al. | 65/348 X |
| 3,934,970 | 1/1976 | McMaster et al. | 65/118 X |
| 3,936,291 | 2/1976 | McMaster | 65/351 |
| 3,947,242 | 3/1976 | McMaster et al. | 432/122 |
| 3,994,711 | 11/1976 | McMaster | 65/114 X |
| 4,282,026 | 8/1981 | McMaster et al. | 65/273 |

FOREIGN PATENT DOCUMENTS 2838127  3/1980  Fed. Rep. of Germany ........ 65/114

Primary Examiner—Arthur D. Kellogg
Attorney, Agent, or Firm—Reising, Ethington, Barnard, Perry, Brooks & Milton

[57] ABSTRACT

A method and quench unit (10,10a,10b) disclosed provide tempering of a heated glass sheet by impinging pressurized air against its opposite surfaces while within a chamber (18) at super-atmospheric pressure. An enclosure (16) of the quench unit defines the chamber (18) and is preferably pressurized by the spent quenching air which is delivered through opposed blastheads (12). The spent quenching air is removed from the chamber (18) to maintain the air pressure below a predetermined level. An air supply system (24) disclosed cools and pressurizes the spent quenching air received from the chamber (18) and then feeds this air back to the blastheads (12) in a recirculating fashion for impingement with the glass sheet in the chamber.

6 Claims, 3 Drawing Figures

GLASS SHEET TEMPERING UTILIZING HIGH DENSITY AIR QUENCHING

TECHNICAL FIELD

This invention relates to the tempering of glass sheets by the use of air quenching.

BACKGROUND ART

The conventional process for tempering glass sheets involves heating a glass sheet within a furnace to a temperature range of about 1100 to 1250 degrees Fahrenheit and then transferring the heated glass sheet to a quench unit where jets of pressurized quenching air, or an equivalent gas, are impinged against its opposite surfaces. Such quenching rapidly cools the outer surfaces of the glass sheet faster than its center so that upon complete cooling the surfaces are subjected to compressive stresses while the center is tensioned. Due to the compressive stresses at the surfaces, tempered glass sheets are much more resistant to breakage than annealed glass. Also, upon breakage, tempered glass sheets shatter into small relatively dull pieces that are harmless instead of into larger sharp slivers as is the case with annealed glass.

Opposed blastheads such as of the type disclosed by U.S. Pat. No. 3,936,291 are conventionally utilized to supply quenching air during glass sheet tempering. Such tempering is conventionally performed on flat glass sheets to provide architectural glass, such as in the manner disclosed by U.S. Pat. Nos. 3,806,312, 3,907,132, 3,934,970, 3,947,242, and 3,994,711. In addition, glass sheets are conventionally bent and then tempered between opposed blastheads to provide vehicle glass, such as in the manner disclosed by U.S. Pat. No. 4,282,026.

Relatively thin glass sheets are much more difficult to temper than thicker ones because the surfaces must be cooled very rapidly in order to set up the thermal gradient between the surfaces and the center. Usually the problem becomes significant when the glass has a thickness of ⅛ inch (i.e. about 3 mm) or less.

The rapid cooling necessary to temper thin glass is conventionally provided by supplying the quenching air to the opposed blastheads at a much greater pressure than is utilized with thicker glass sheets. Substantial energy is thus required to pressurize the quenching air in order to temper thin glass, especially at facilities located at high altitudes where the air is much less dense than at lower altitudes. In addition, air quenching of thin glass is much more noisy than for thicker glass due to the high pressure of the quenching air used.

DISCLOSURE OF INVENTION

An object of the present invention is to provide an improved method and quench unit for tempering heated glass sheets. In carrying out this object, the tempering method and quench unit disclosed are capable of tempering relatively thin glass sheets with much less energy input than is necessary with the conventional type of air quenching. In addition, tempering of thinner glass sheets than heretofore possible can be performed in accordance with the invention. Also, the improved air quenching disclosed is much quieter than conventional air quenching when utilized to temper thin glass sheets. Furthermore, testing to date has indicated that less breakage occurs.

The method for tempering a heated glass sheet in accordance with the invention is performed by impinging quenching air, or an equivalent gas against the opposite surfaces of a heated glass sheet while within a chamber at superatmospheric pressure. It has been found that there is a much greater degree of heat transfer between the quenching air and the heated glass sheet when the quenching is performed at a greater pressure than the atmosphere. As such, less energy is necessary to perform the tempering than is required with conventional air quench units. Tempering of thinner glass sheets than heretofore possible can be achieved due to the greater heat transfer that takes place. Performing the quenching within the chamber also decreases the environmental noise and thereby provides a more desirable operation. In addition, testing to date has indicated that less breakage occurs when the quenching is performed within the pressurized chamber.

In the preferred practice of the tempering method, the quenching air is supplied through opposed blastheads received within the chamber and the superatmospheric pressure within the chamber is maintained by the spent quenching air after impingement thereof with the glass surfaces. It is possible to initially pressurize the chamber by air at superatmospheric pressure prior to impingement of the quenching air with the heated glass sheet or by the spent quenching air as the tempering commences. The spent quenching air is removed from the chamber to maintain the air pressure within the chamber below a predetermined level. While it is possible to merely spill the air from the chamber to the environment, further energy savings can be achieved by cooling and pressurizing the air which is then fed back to the blastheads in a recirculating fashion.

The glass sheet quench unit in which the invention is incorporated includes opposed blastheads for impinging quenching air, or an equivalent gas, against a heated glass sheet positioned therebetween to temper the glass sheet. In accordance with the invention, the quench unit includes a blasthead enclosure defining the chamber which receives the blastheads and which is pressurized with superatmospheric pressure during the tempering.

The blasthead enclosure of the quench unit includes an access opening through which the heated glass sheet is moved into the chamber to a location between the blastheads. Thereafter, a door of the quench unit closes the access opening to allow the spent quenching air to maintain the chamber at superatmospheric pressure as the tempering proceeds. The spent quenching air is removed from the chamber either by a pressure relief valve or by a recirculating air supply system to provide a means for maintaining the air pressure within the chamber below a predetermined level.

The quench unit is also disclosed as preferably including an air supply system that cools and pressurizes the air removed from the chamber and then feeds the cooled and pressurized air back to the blastheads within the chamber in a recirculating fashion in order to effect further energy savings.

During the tempering, the glass sheet can be disposed in either vertical or horizontally extending orientations. Also, both flat glass sheets and bent glass sheets can be tempered by the method and quench unit disclosed.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
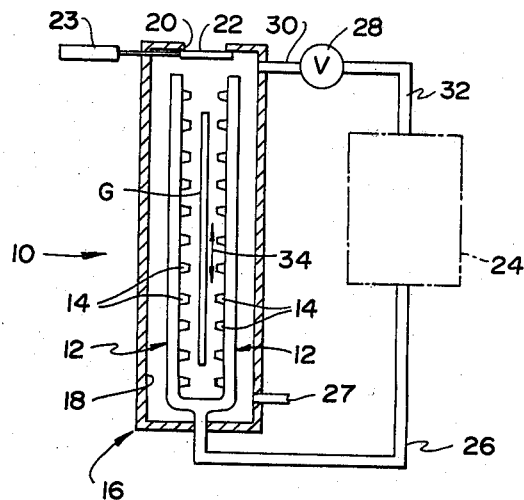
FIG. 1 is a schematic view illustrating a quench unit that is constructed in accordance with the present invention and utilized to perform the tempering method of the invention.

Referring to FIG. 1 of the drawings, a quench unit for tempering glass sheets is indicated generally by reference numeral 10 and includes opposed blastheads 12 having outlets 14 for delivering pressurized quenching air. The quenching air delivered by the blastheads 12 is impinged against a heated glass sheet G positioned therebetween to temper the glass sheet. Any suitable type of support such as suspension tongs or a suitable fixture may be utilized to position the glass sheet G in its vertically extending orientation shown between the blastheads.

In accordance with the present invention, the quench unit 10 includes a blasthead enclosure 16 defining a chamber 18 which receives the blastheads 12. As is hereinafter more fully described, the chamber 18 is pressurized with superatmospheric pressure during the tempering operation.

It has been found that distinct advantages are achieved by the quench unit 10 as a result of the manner in which quenching air is impinged against the opposite surfaces of the heated glass sheet G while within the chamber 18 at superatmospheric pressure. Improved heat transfer achieved is believed to result from two factors. First, since the heat transfer rate depends on the mass flow of air, the dense air at superatmospheric pressure provides a greater amount of heat transfer than the same volume of air at atmospheric pressure. Second, the superatmospheric pressure in the chamber 18 is believed to affect the stationary boundary layer of air at the glass surface in a manner that reduces the impedance to heat flow between the glass sheet and the moving quenching air.

The improved heat transfer achieved enables thinner glass sheets to be tempered than heretofore possible. In addition, tempering of thin glass sheets can be performed much more efficiently than with conventional air quenching. Also, a relatively quiet quenching operation is achieved by virtue of the enclosure 16 in which tempering is performed. Furthermore, testing to date has indicated that less breakage occurs when the quenching is performed within the pressurized chamber 18.

With continuing reference to FIG. 1, the blasthead enclosure 16 includes an access opening 20 through which the heated glass sheet G is moved into the chamber 18. A door 22 of the enclosure is moved by a suitable actuator 23 from an open position to the closed position illustrated after the heated glass sheet has been received within the chamber 18. A schematically illustrated air supply system 24 of the quench unit has an outlet conduit 26 that feeds pressurized air to the opposed blastheads 12 in order to perform the tempering operation. As the quenching air is delivered through the blastheads 12 and impinged with the glass sheet G, the spent quenching air pressurizes the enclosure 16 to provide the superatmospheric pressure of the chamber 18. After completion of the tempering, the door 22 is opened and the tempered glass sheet G is removed from the chamber 18.

It is also possible for the chamber 18 to be initially pressurized by air at superatmospheric pressure delivered independently of the blastheads 12 through a conduit 27 of the air supply system 24 or of another independent air supply system. After the quenching initially begins, the spent quenching air maintains the pressure within the chamber 18 at superatmospheric pressure.

Quench unit 10 as shown in FIG. 1 also includes a pressure relief valve 28 that is connected by a conduit 30 to the chamber 18 defined by the enclosure 16. Valve 28 removes the spent quenching air from the chamber 18 and provides a means for maintaining the air pressure within the chamber below a predetermined level. In deciding what pressure should be selected, it should be noted that any increase in the pressure within the chamber 18 above the atmospheric pressure will produce increased cooling of the glass sheet as tempering is performed. However, it is preferable for the pressure to be at least ten pounds per square inch above the atmospheric pressure in order to provide sufficient increased cooling to economically justify the cost involved with this quench unit as compared to conventional quench units. Likewise, the pressure should be no more than about one hundred pounds per square inch above atmospheric pressure since the cost involved in designing the enclosure 16 to withstand any greater pressure would not appear to be warranted. Testing to date has shown that a pressure of about forty pounds per square inch above atmospheric pressure provides good results.

While it is possible for the air from the pressure relief valve 28 to be spilled to the environment, energy and hence cost can be saved by recirculating the air. As illustrated, the outlet of the pressure relief valve 28 feeds a conduit 32 that is connected to the air supply system 24. During operation of the quench unit, the air supply system 24 both cools and pressurizes the air to remove the heat acquired during the tempering and to make up for the pressure drop that takes place upon delivery by the blastheads and any pressure drop due to leakage. The cooled and pressurized air is fed by supply system 24 through the conduit 26 in a recirculating manner back to the blastheads 12 within chamber 18 for impingment with the glass sheet.

It is also possible for the spent quenching air to be fed to the air supply system 24 without any pressure relief valve. In such case, a fixed volume of air is received within the quench unit and the supply system 24 includes a constant volume compressor whose operation feeds pressurized air to the blastheads 12 within the chamber 18 and also removes the spent quenching air to thereby provide a means for maintaining the superatmospheric pressure within the chamber below a predetermined level.

It is best to provide relative movement between the outlets 14 of the blastheads 12 and the glass sheet G being tempered in order to provide a distribution of the quenching air. Such relative movement can be provided by moving the glass sheet G in opposite directions as illustrated by arrows 34. In addition, it is also possible to hold the glass sheet G stationary and move the blastheads 12 to provide the relative movement.

Figure 2:
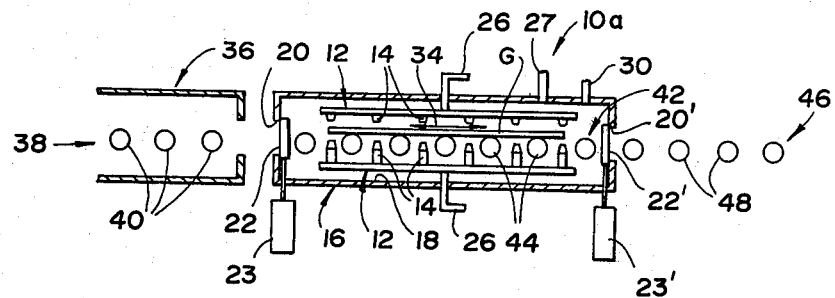
FIG. 2 is a schematic view illustrating another embodiment of the quench unit for performing tempering of flat glass sheets on a roller conveyor.

With reference to FIG. 2, another embodiment of the quench unit 10 has a construction similar to the previously described embodiment and accordingly has like reference numerals applied to like components thereof and much of the previous description is applicable such that no repetition thereof is necessary. Quench unit 10a is designed to temper flat glass sheets while in a horizontal position. A furnace 36 in which the heating takes place includes a roller conveyor 38 whose rolls 40 convey the glass sheet G during the heating prior to transfer to the quench unit. Adjacent the furnace 36, the enclosure 16 of the quench unit includes an entrance access opening 20 that is opened and closed by a door 22 under the operation of the door actuator 23. A roller conveyor 42 of the quench unit includes rolls 44 that are spaced along the quench unit between the upper and lower blastheads 12. Enclosure 16 of the quench unit 10a also includes an exit access opening 20' that is opened and closed by its associated door 22' under the operation of the associated door actuator 23'. A delivery conveyor 46 is located downstream from the exit opening 20' and includes conveyor rolls 48 that receive the tempered glass sheet after the tempering process.

During the operation of the quench unit 10a shown in FIG. 2, both the entrance and exit doors 22 and 22' open upon commencement of a transfer cycle whereupon a heated glass sheet is conveyed from the furnace conveyor 38 to the quench unit conveyor 42 and a previously tempered glass sheet is simultaneously conveyed from the quench unit conveyor to the delivery conveyor 46. Both the entrance and exit doors 22 and 22' then close and the pressurized quenching operation previously described is performed as the quench unit conveyor 42 oscillates the glass sheet back and forth as illustrated by arrows 34 to provide distribution of the quenching air. After completion of the tempering process, the entrance and exit doors 22 and 22' open and the transfer then begins to start the next cycle.

Figure 3:
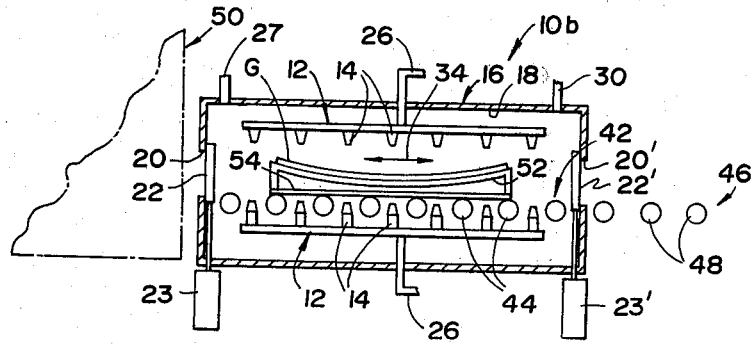
FIG. 3 is a view of yet another embodiment of the quench unit for tempering bent glass sheets.

With reference to FIG. 3, another embodiment 10b of the quench unit is similar to the two previously described embodiments and accordingly has like reference numerals applied to like components thereof and much of the previous description is applicable such that no repetition thereof is necessary. Quench unit 10b is designed to temper bent glass sheets in accordance with the present invention. A heated and bent glass sheet is received by the quench unit 10b from a bending system 50 such as of the type disclosed by U.S. Pat. No. 4,282,026. The bent glass sheet is transported by a mold 52 of the open center ring type that engages the periphery of the glass sheet. Mold 52 is supported by a frame 54 that is moved in any suitable manner such as by conveyance on the quench unit conveyor 42. After conveyance of the mold 52 into the quench unit, both the entrance and exit doors 22 and 22' close and the pressurized quenching is performed in the manner previously described to temper the bent glass sheet as the quench unit conveyor 42 moves the glass sheet back and forth as shown by arrows 34 to distribute the quenching air. Upon completion of the tempering, the entrance and exit doors 22 and 22' open to permit the tempered glass sheet to be conveyed from the quench unit to the delivery conveyor 46.

It should be appreciated that it is not necessary for the entire extent of the blastheads 12 to be located within the enclosure 16 so long as the outlets 14 thereof are within the chamber. In certain designs, it may be desirable for the blastheads 12 to include manifolds outside of the enclosure 16 and outlet conduits that extend into the chamber 18 to deliver the quenching air. Such designs are considered for purposes of this invention as being blastheads received within the chamber defined by the enclosure since the location of the blasthead manifolds does not affect the pressure within the chamber.

While the best modes for carrying out the invention have been described in detail, those familiar with the art to which this invention relates will recognize various alternative designs and embodiments for practicing the invention as defined by the following claims.

What is claimed is:

1. A method for tempering a heated glass sheet comprising: impinging quenching air against the opposite surfaces of the heated glass sheet while within an enclosed chamber maintained at superatmospheric pressure above about 10 pounds per square inch over atmospheric pressure.

2. A method for tempering a heated glass sheet comprising: impinging quenching air against the opposite surfaces of the heated glass sheet while within an enclosed chamber maintained at superatmospheric pressure; and cooling and recirculating the pressurized quenching air for repeated impingement with the glass sheet.

3. A method for tempering a heated glass sheet comprising: impinging quenching air against the opposite surfaces of the heated glass sheet while within an enclosed chamber maintained by the spent quenching air at superatmospheric pressure above about 10 pounds per square inch over atmospheric pressure; and cooling and recirculating the pressurized quenching air for repeated impingement with the glass sheet.

4. In a glass sheet quench unit including opposed blastheads for impinging quenching air against a heated glass sheet positioned therebetween to temper the glass sheet, the improvement comprising: a blasthead enclosure defining an enclosed chamber which receives the blastheads and which is pressurized with superatmospheric pressure during the tempering; and means for sensing and controlling the superatmospheric pressure within the chamber.

5. In a glass sheet quench unit including opposed blastheads for impinging quenching air against a heated glass sheet positioned therebetween to temper the glass sheet, the improvement comprising: a blasthead enclosure defining an enclosed chamber which receives the blastheads and which is pressurized with superatmospheric pressure during the tempering; and means for cooling and recirculating the pressurized quenching air for repeated impingement with the glass sheet.

6. In a glass sheet quench unit including opposed blastheads for impinging quenching air against a heated glass sheet positioned therebetween to temper the glass sheet, the improvement comprising: a blasthead enclosure defining an enclosed chamber which receives the blastheads and which is pressurized with superatmospheric pressure during the tempering; means for sensing and controlling the superatmospheric pressure within the chamber; and means for cooling and recirculating the pressurized quenching air for repeated impingement with the glass sheet.

* * * * *